US010247811B2

(12) United States Patent
Clifton

(10) Patent No.: US 10,247,811 B2
(45) Date of Patent: Apr. 2, 2019

(54) MODULATION OF INPUT TO GEIGER MODE AVALANCHE PHOTODIODE LIDAR USING DIGITAL MICROMIRROR DEVICES

(71) Applicant: HARRIS CORPORATION, Melbourne, FL (US)

(72) Inventor: William E. Clifton, Melbourne, FL (US)

(73) Assignee: Harris Corporation, Melbourn, FL (US)

( * ) Notice: Subject to any disclaimer, the term of this patent is extended or adjusted under 35 U.S.C. 154(b) by 360 days.

(21) Appl. No.: 14/515,837

(22) Filed: Oct. 16, 2014

(65) Prior Publication Data
US 2016/0109561 A1 Apr. 21, 2016

(51) Int. Cl.
| G01J 1/20 | (2006.01) |
| G01S 7/481 | (2006.01) |
| G01J 1/42 | (2006.01) |
| G02B 26/08 | (2006.01) |
| G02B 23/12 | (2006.01) |
| G01S 17/89 | (2006.01) |
| G01S 7/486 | (2006.01) |
| G01S 7/497 | (2006.01) |
| G01J 1/04 | (2006.01) |
| G01J 1/02 | (2006.01) |

(52) U.S. Cl.
CPC .......... G01S 7/4816 (2013.01); G01J 1/0228 (2013.01); G01J 1/0414 (2013.01); G01J 1/4228 (2013.01); G01S 7/4868 (2013.01); G01S 7/497 (2013.01); G01S 17/89 (2013.01); G02B 23/12 (2013.01); G02B 26/0833 (2013.01); G02B 26/0841 (2013.01); *G01J 2001/4233* (2013.01)

(58) Field of Classification Search
CPC ...... G01S 7/486; G01S 7/4861; G01S 7/4863; G01S 7/4865; G02B 26/0833; G02B 26/0841; G01J 1/4228; G01J 1/4238
USPC ........................................... 250/203.1, 203.2
See application file for complete search history.

(56) References Cited

U.S. PATENT DOCUMENTS

| 5,892,575 A * | 4/1999 | Marino ..................... G01C 3/08 |
| | | 356/141.4 |
| 6,337,760 B1 * | 1/2002 | Huibers ............... G02B 6/3518 |
| | | 359/223.1 |

(Continued)

OTHER PUBLICATIONS

Texas Instruments, "DLP (TM) System Optics" Application Report, DLPA022, Jul. 2010, copyright 2010, Texas Instruments Incorporated.

(Continued)

*Primary Examiner* — Georgia Y Epps
*Assistant Examiner* — Kevin Wyatt
(74) *Attorney, Agent, or Firm* — Fox Rothschild LLP; Robert J. Sacco; Carol E. Thorstad-Forsyth

(57) ABSTRACT

Systems (100) and methods (600) for acquiring data relating to an environment of interest. The methods comprise: receiving by a telescope (110) light scattered by an object within the environment; focusing a cone of light towards a spatial light modulator (112) which is placed a certain distance from the telescope on a telescope-focus surface; and deflecting a select amount of the cone of light by the spatial light modulator towards a photodiode array (114), whereby a sensitivity across the photodiode array is made uniform.

16 Claims, 4 Drawing Sheets

(56) References Cited

U.S. PATENT DOCUMENTS

| | | | | |
|---|---|---|---|---|
| 6,359,681 | B1* | 3/2002 | Housand | G01S 7/481 356/4.01 |
| 2002/0196506 | A1* | 12/2002 | Graves | H04B 10/1125 398/126 |
| 2006/0175530 | A1* | 8/2006 | Wilcox | G02B 26/06 250/208.1 |
| 2007/0229993 | A1* | 10/2007 | Hemmati | G02B 23/06 359/846 |
| 2011/0164783 | A1* | 7/2011 | Hays | G01S 17/58 382/100 |
| 2014/0125860 | A1* | 5/2014 | Tofsted | G06T 5/001 348/349 |

OTHER PUBLICATIONS

Younger, R.D., et al., "Crosstalk Analysis of Integrated Geiger-mode Avalance Photodiode Focal Plane Arrays," Advanced Photon Counting Techniques III, Proc. of SPIE vol. 7320, copyright 2009 SPIE code: 0277-786X; DOI: 10.1117/12.819173.

Del Guasta, M., et al., "A Photodiode-Based, Low Cost Telemetric-Lidar for the Continuous Monitoring of Urban Particulate Matter," DOI: 10.5772/19328, ISBN: 978-953-307-277-7, Sep. 6, 2011 under CCBY-NC-SA 3.0 License, copyright the Author(s).

Razenkov, I., "Characterization of a Geiger-Mode Avalanche Photodiode Detector for High Spectral Resolution Lidar," A thesis submitted in partial fulfillment of the requirements for the degree of Master of Science at the University of Wisconsin-Madison, 2010.

Texas Instruments, "DLP (TM) System Optics" Application Report, DLPA022, Jul. 2010.

* cited by examiner

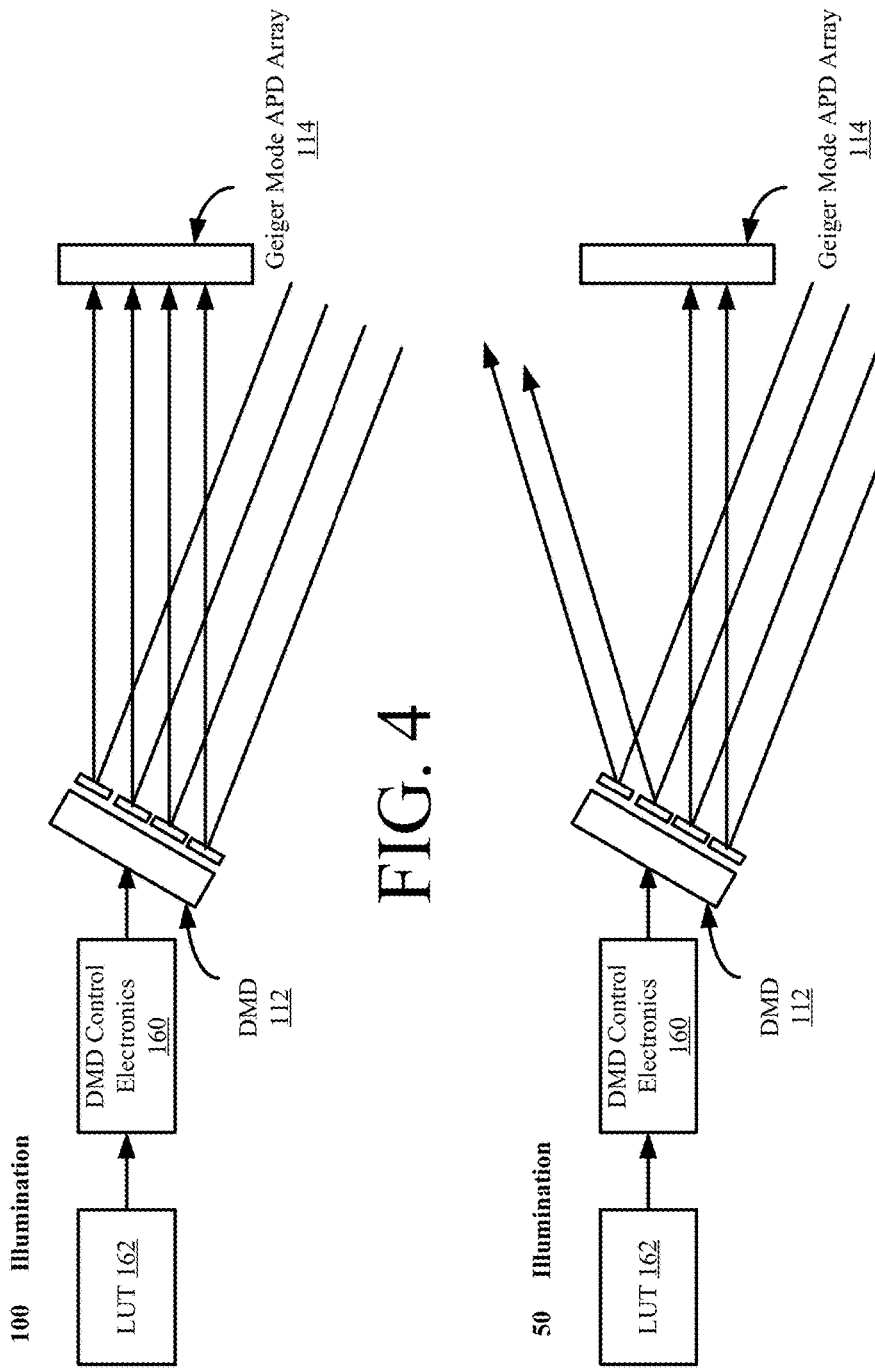

MODULATION OF INPUT TO GEIGER MODE AVALANCHE PHOTODIODE LIDAR USING DIGITAL MICROMIRROR DEVICES

BACKGROUND

Statement of the Technical Field

The inventive arrangements relate to Light Detection and Ranging ("LIDAR") systems. More particularly, the inventive arrangements concern systems and implementing methods for modulating an input to a Geiger mode Avalanche PhotoDiode ("APD") array using Digital Micromirror Devices ("DMD5").

Description of the Related Art

Conventional LIDAR range finding systems have been used in civil and defense applications for many years. For example, the LIDAR range finding systems have been used to collect 3D information specifying characteristics of terrain and/or objects. In this regard, the LIDAR range finding systems are generally configured to measure the distance therefrom to a terrain surface or object's surface. Such measurements can be achieved using a single laser beam, and time-of-flight computations. A 3D image of the terrain or object surface may then be created using the distance measurements. This type of data is known in the art as 3D cloud point data.

The described LIDAR range finding systems may employ a Geiger mode APD detector or an array of detectors for detecting light reflected off of an object spaced a distance therefrom. The term "Geiger mode" refers to an application of a bias voltage which exceeds the breakdown voltage of the APD detector. When the APD detector is over biased, the APD operates in a metastable state where a single photon may cause an avalanche current. The avalanche current can then be detected using simple digital circuitry. In the case of Lidar, the detection of an avalanche stops a timing circuit which in turn is used to measure the time of flight of a transmitted laser pulse to the object. The distance to the object can then be determined given the speed of light.

Despite the advantages of Geiger mode APD detectors, they suffer from certain drawbacks. For example, the Geiger mode APD arrays may comprise unresponsive detectors ("dead detectors") and continuously triggering detectors ("hot detectors"). While the data from the dead and hot detectors can be discarded during post processing, the hot detectors may cause crosstalk between surrounding detectors. Additionally, the voltage at which an avalanche occurs (i.e., the breakdown voltage) can exhibit significant variation between detectors in the array. The breakdown voltage level determines the sensitivity or photon detection efficiency across the Geiger mode APD array and cannot be controlled with the high level of precision required for producing superior imagery.

Various techniques have been derived for reducing the undesirable side effects of the variation in detector sensitivity across Geiger mode APD arrays. One technique involves modifying the spacing and geometry of the APDs in the array during design. Another possible technique is to individually adjust the bias level of every APD detector in the Geiger mode APD array. Additionally, a calibration lookup table can be generated for each detector in the array based on the measured sensitivity of the detector. This lookup table can then be used to compensate for the non-uniform array sensitivity during the process. However, such calibration lookup tables do not affect the noise contributions due to hot detectors.

SUMMARY OF THE INVENTION

The invention concerns implementing systems and methods for acquiring data relating to an environment of interest. The methods comprise: receiving by a telescope light scattered by an object within the environment; focusing a cone of light towards a spatial light modulator which is placed a certain distance from the telescope on a telescope-focus surface; and deflecting a select amount of the cone of light by the spatial light modulator towards a photodiode array (e.g., a Geiger mode APD array), whereby a sensitivity across the photodiode array is made uniform. The amount of the cone of light is selected to cause full or only partial illumination of the photodiode array.

In some scenarios, the spatial light modulator comprises a digital micromirror device. As such, the spatial light modulator can comprise an array of micromirrors arranged in a geometric form which corresponds to scene content to be modulated prior to reaching the photodiode array. The area of the individual micromirrors in the array may be smaller than the area of the APD detector allowing all, some or none of the micromirrors to be positioned such that the level of light reaching a specific APD detector can be modulated, compensating for the sensitivity of that specific APD. Each of the micromirrors may be statically placed in one of at least two tilted positions corresponding to "on" where the micromirror directs the incoming light to the APD array and "off" where the micromirror does not direct the incoming light to the APD array. Alternatively, the tilted position of at least one micromirror is dynamically modified based on a detected state of at least one photodiode of the photodiode array in the case of a scene with a high variation in reflectivity.

In those or other scenarios, the method further involves: detecting at least one dead or hot photodiode of the photodiode array; assigning at least one micromirror of the spatial light modulator to the dead or hot photodiode; and tilting the micromirror in a direction away from illumination by the telescope.

BRIEF DESCRIPTION OF THE DRAWINGS

Embodiments will be described with reference to the following drawing figures, in which like numerals represent like items throughout the figures, and in which:

FIG. 4 is a schematic illustration showing deflection of a first amount of light by a micromirror device during a first period of time so as to cause a 100% illumination of a Geiger mode APD array.

FIG. 5 is a schematic illustration showing deflection of a second amount of light by a micromirror device so as to cause 50% illumination of a Geiger mode APD array.

DETAILED DESCRIPTION

Figure 1:
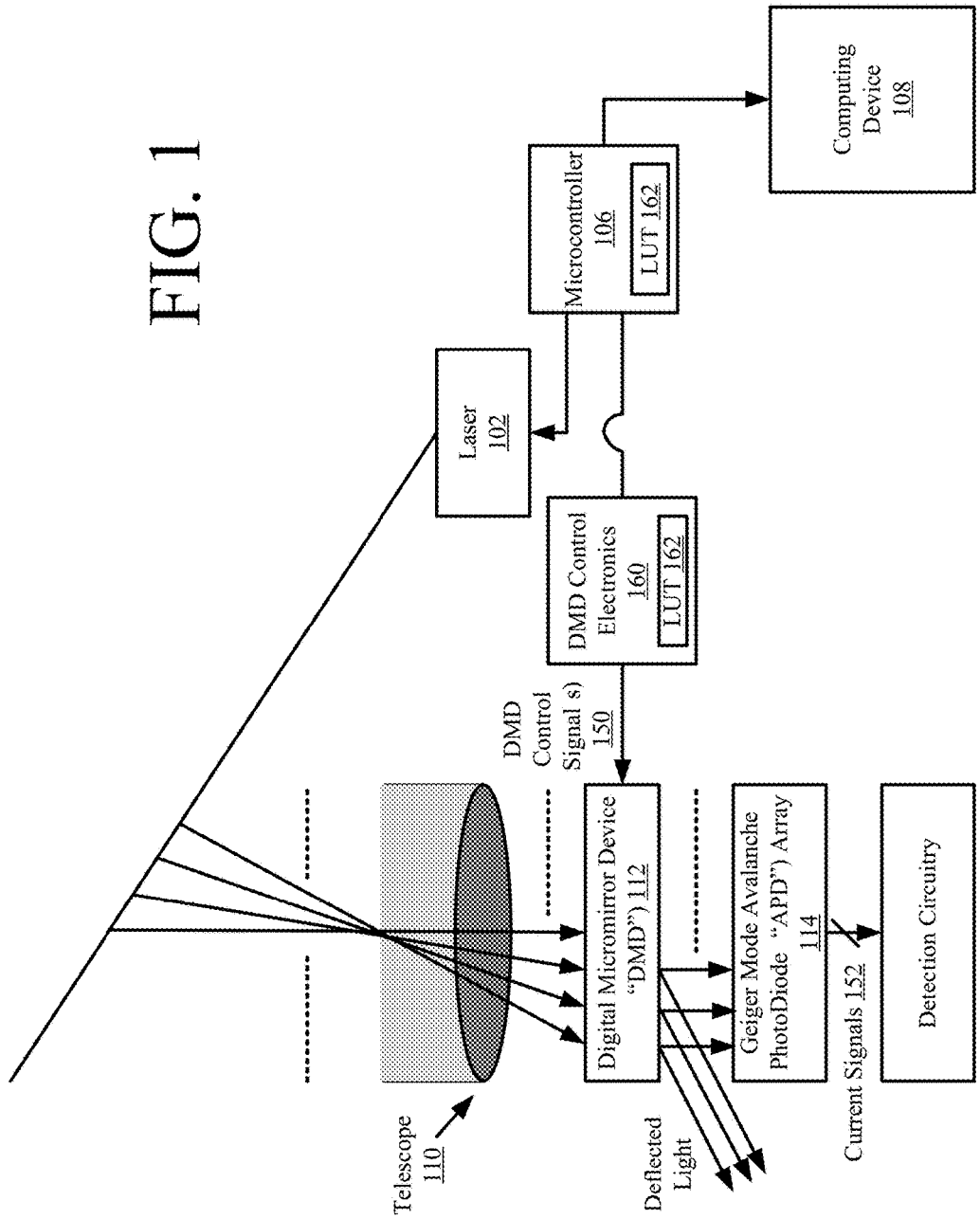
FIG. 1 is a schematic illustration of an exemplary architecture for a LIDAR ranging system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present invention generally concerns systems and methods for acquiring data relating to an environment of interest. The methods comprise: receiving by a telescope light scattered by an object within the environment; focusing a cone of light towards a spatial light modulator which is placed a certain distance from the telescope on a telescope-focus surface; and deflecting a select amount of the cone of light by the spatial light modulator towards a photodiode array (e.g., a Geiger mode APD array), whereby a sensitivity across the photodiode array is made uniform. The amount of the cone of light is selected to cause full or only partial illumination of the photodiode array. In the case of partial illumination, the deflecting causes a spatial mapping of scene content to at least one first photodiode of the photodiode array and a blocking of light from passing to at least one second photodiode of the photodiode array.

Referring now to FIG. 1, there is provided a schematic illustration of an exemplary architecture for a LIDAR ranging system 100 that is useful for understanding the present invention. System 100 is generally configured to generate multi-dimensional data for a terrain surface, an object's surface and/or an air volume. In this regard, system 100 comprises a laser 102, a microcontroller 106, a computing device 108, a telescope 110, a spatial light modulator (e.g., a DMD) 112, DMD control electronics 160, a photodiode array (e.g., a Geiger mode APD array) 114. The present invention is not limited to the particular architecture shown in FIG. 1. System 100 may include more or less components than that shown in FIG. 1.

The laser 102 comprises a pulsed laser source for probing air volumes, terrain surface and/or objects. In this regard, the laser 102 illuminates an environment with a laser beam. In effect, the laser 102 emits pulses of light in a direction towards an environment of interest. The emitted light is scattered when it contacts a terrain surface, an object or aerosol. A portion of the scattered light travels in the direction towards the telescope 110.

The telescope 110 focuses the scattered light towards the DMD 112, which is placed a certain distance therefrom on the telescope-focus surface. The light cone produced by the telescope travels to the DMD 112.

The DMD 112 permits the deflection of a select amount of the light cone from the lens to the Geiger mode APD array 114. For example, the DMD 112 can permit deflection of a first amount of light during a first period of time so as to cause a 100% illumination of the Geiger mode APD array 114 (as shown in FIG. 4). Alternatively or additionally, the DMD 112 can permit deflection of a second amount of light so as to cause less than 100% (e.g., 50%) illumination of the Geiger mode APD array 114 (as shown in FIG. 5). The manner in which this selective deflection/illumination is achieved will become evident as the discussion progresses.

The DMD 112 is generally a bi-stable spatial light modulator. DMDs are well known in the art, and therefore will not be described herein in detail. However, a brief discussion of an exemplary architecture for DMD 112 will now be described in relation to FIGS. 2-3. Notably, other types of spatial light modulators can be used herein in addition to or as an alternative to the DMD provided that they can facilitate the selective control of the amount of illumination of the Geiger mode APD array 114.

Figure 2:
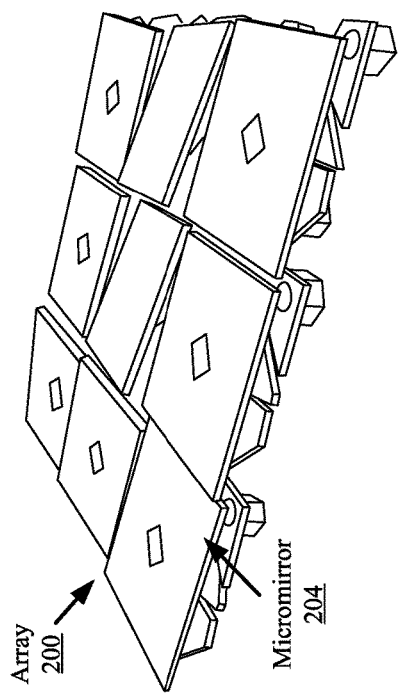
FIG. 2 is a schematic illustration of an exemplary architecture for an array of micromirrors comprising the digital mirror device shown in FIG. 1.
Figure 3:
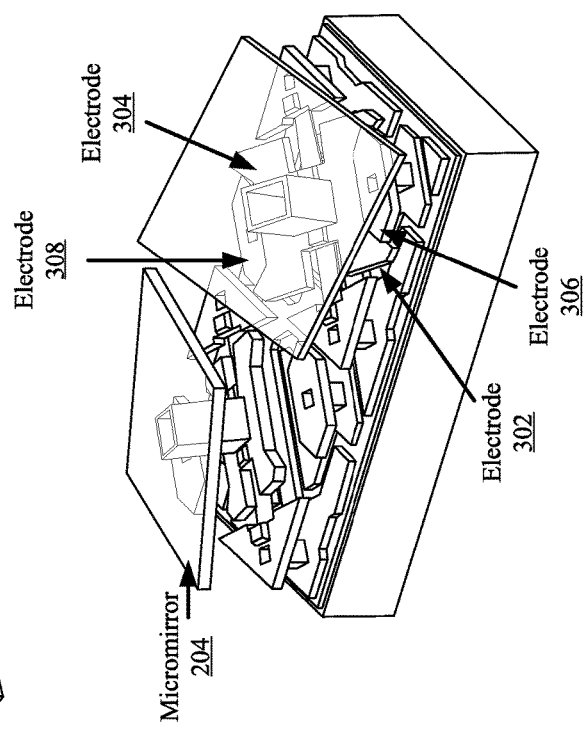
FIG. 3 is a schematic illustration that is useful for understanding operations of a micromirror.

As shown in FIGS. 2-3, the DMD comprises an array of Micromirrors ("MMs") 200 (e.g., an array of up to 8 million MMs) arranged in a generally rectangular form which corresponds to the scene content to be modulated prior to reaching the Geiger mode APD array 114. Each MM 204 is independently controllable by loading data into a memory cell (not visible in FIGS. 2-3) below the MM to steer reflected light, spatially mapping scene content to at least one APD detector of the Geiger mode APD array 114 and arbitrarily blocking light (or scene content) from passing to any particular APD detector of the Geiger mode APD array 114.

The light steering is achieved by placing each MM 204 in one of two positions. The two positions determine the direction that light is deflected from the respective MM 204. The two positions comprise a first position which defines an OFF state and a second position which defines an ON state. In the first position, the MM 204 is tilted away from the illumination provided by the telescope 110 by a certain number of degrees (e.g., −10° to −12°). Thus, the light is directed somewhere other than the Geiger mode APD array 114. In the second position, the MM 204 is tilted by a certain number of degrees (e.g., +10° to +12°) towards the illumination provided by the telescope. Light reflected by the ON MMs then passes to the Geiger mode APD array 114.

Two pairs of electrodes 302/304 and 306/308 facilitate control of the position of a respective MM 204 by electrostatic attraction. Each pair has one electrode on each side of a hinge (not visible in FIGS. 2-3), with one of the pairs positioned to act on the yoke and the other acting directly on the MM. Bias charges are applied to the electrodes so as to cause the MM to tilt a number of degrees in a particular direction.

To move an MM, a required state indicator is loaded into the memory cell located therebeneath. The required state indicator can be determined by the DMD control electronics 160 and/or microprocessor 106 based on a Look Up Table ("LUT") 162. The memory cell is electrically connected to the electrodes. Thereafter, the bias voltage is then removed, allowing the charge from the memory cell to prevail so as to cause movement of the MM. When the bias voltage is restored, the MM is held in its tilted position.

Notably, the MMs may have a generally square shape with an M μm (e.g., 10 μm to 16 μm) dimension on each side. The distance between APD detectors (e.g., 50-100 μm) is larger as compared to M. In effect, multiple MMs 204 are assigned to each APD detector. This allows the amount of light reaching the APD detectors to be precisely adjusted statically or on a flash-by-flash basis up to 20 kHz based on currently available DMDs.

Therefore, in some scenarios, the state of each MM 204 is statically set such that the sensitivity of the Geiger mode APD array 114 is uniform thereacross. The uniform sensitivity is achieved by placing the MMs 204 which can map scene content to dead and hot detectors of the Geiger mode APD array 114 in their OFF state. The MMs which should be placed in their OFF states may be identified via an iterative testing/calibration process performed prior to use of the system 100. Consequently, these dead and hot detectors do not collect the scattered light focused by telescope 110, whereby crosstalk contributions thereof are eliminated.

In other scenarios, the position of each MM is selectively controlled during use of the system 100 for providing sensitivity uniformity across the Geiger mode APD array 114. The microcontroller 106 controls the state transitions for each MM based on various information. For example, MM state transitions can be controlled based on the following criteria: the current and past states of all APD detectors (e.g., whether dead or hot detectors. In areas of hot and/or dead APD detectors (i.e., areas of high signal levels), some MMs can be turned OFF to reduce the incoming signal. Such control is achieved by generating and forwarding DMD control signals 150 from the DMD control electronics 160 to the DMD 112.

Referring again to FIG. 1, the Geiger mode APD array 114 comprises an array of APD detectors that are sensitive to given wavelengths (e.g., 1.06 μm to 1.55 μm) of light. APD detectors are well known in the art, and therefore will not be described in detail herein. Still, it should be understood that each APD detector converts received photons into photoelectrons based on the quantum efficiency of the APD detector. If a photoelectron is produced, it may produce an avalanche in the APD operating in non-linear, over-biased Geiger mode. The avalanche creates a current flow detectable by simple dedicated digital circuitry bonded directly to each APD detector in the array. In a Lidar system, detection of the avalanche by the digital circuit stops a timer which was started when the laser pulse was created, thereby measuring the round trip time of flight to the illuminated object. The probability that a photon incident on an APD detector creates an avalanche current which in turn is detected by the digital circuitry of the detector is referred to as the Photon Detection Efficiency ("PDE") of the detector. Therefore, a Geiger mode APD based detection system is inherently digital, i.e., and no additional amplification or filtering is required. The microcontroller 106 communicates with a computing device 108 for storing and/or displaying multidimensional data representing scene content to a user thereof. For example, 2D or 3D cloud point data of a terrain surface, an object's surface or an air volume is presented to the user.

In view of the forgoing, it should be apparent that the present invention provides a low-cost solution for reducing or eliminating noise sources inherent in Geiger mode APD array, based on a component in mass production. As a result of the reduction or elimination of noise in the Geiger mode APD array, overall image quality is improved. The present invention also allows Geiger mode APD arrays with highly non-uniform sensitivity, which previously would have been discarded, to be salvaged thereby increasing effective yields and lowering the cost of the detector arrays. Crosstalk between hot APD detectors in a Geiger mode APD array is also decreased in the present invention. Also, a subset of the APD detectors in the array expose to areas of high scene reflectivity may be masked in the present invention, and the sensitivity of the un masked Geiger mode APD detectors in the array can be increased to allow imaging of features with low reflectivity whereby the dynamic range of the sensor is also increased. The DMD 112 may also be controlled to act as a safety shutter in the case of excessive signal levels capable of destroying the Geiger mode APD array 114.

Figure 6:
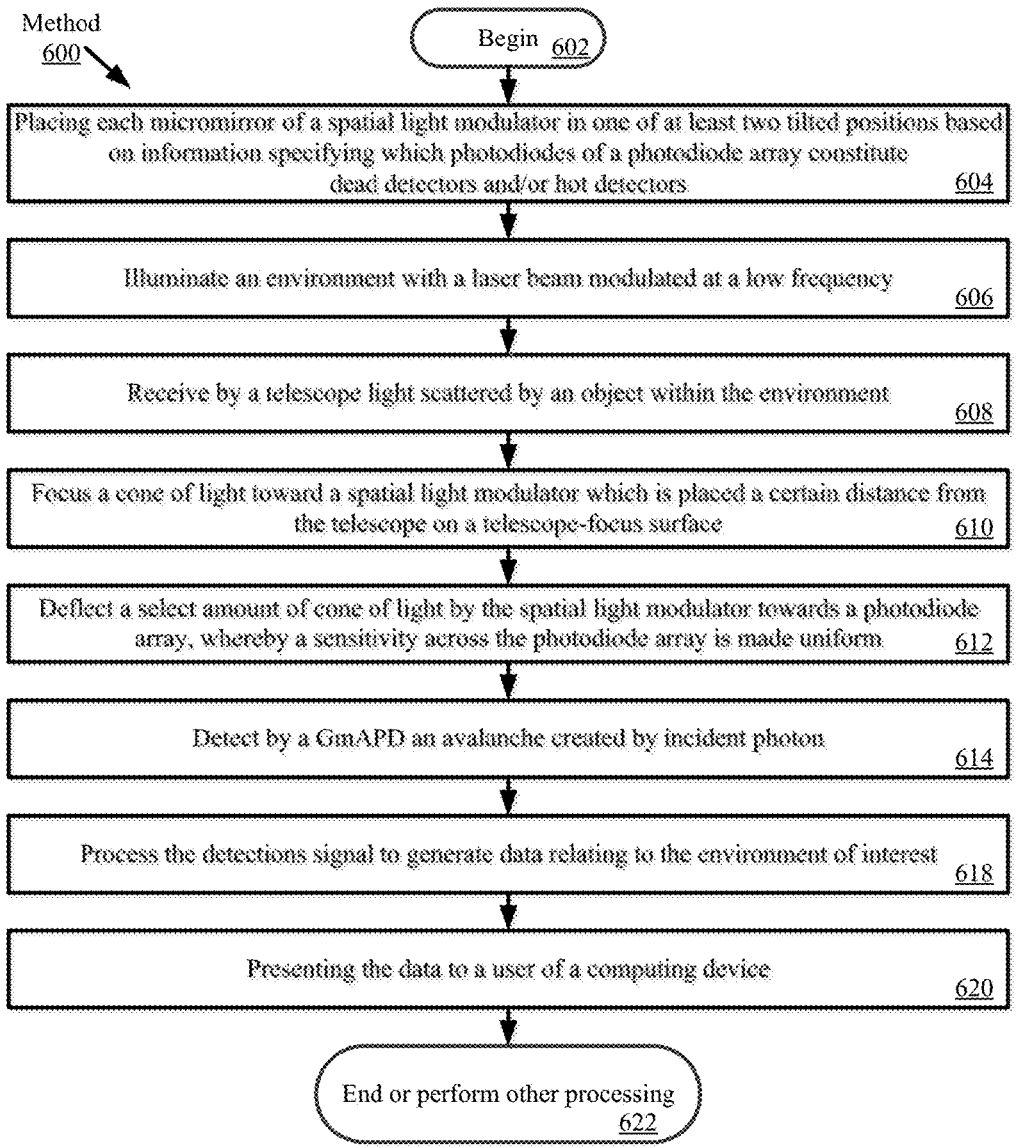
FIG. 6 is a flow diagram of an exemplary method for acquiring data relating to an environment of interest.

Referring now to FIG. 6, there is provided a flow diagram of an exemplary method 600 for acquiring data relating to an environment of interest. Method 600 begins with step 602 and continues with step 604. Step 604 involves placing each micromirror of a spatial light modulator (e.g., DMD 112 of FIG. 1) in one of at least two tilted positions based on information specifying which photodiodes of a photodiode array constitute dead detectors or hot detectors. In this regard, step 604 can involve: detecting which photodiode of the array constitute dead detectors (or dead photodiodes) or hot detectors (or hot photodiodes); assigning at least one first micromirror of the spatial light modulator to the dead or hot photodiode(s); and tilting the first micromirror in a direction away from illumination by the telescope.

Next in step 606, an environment is illuminated with a laser pulse. The emitted light is scattered when it contacts a terrain surface, an object or aerosol. A portion of the scattered light travels in the direction towards a telescope (e.g., telescope 110 of FIG. 1). Thus, in step 608, the scattered light is received by the telescope. The telescope focuses a cone of light towards the spatial light modulator, as shown by step 610. The spatial light modulator is placed a certain distance from the telescope on a telescope-focus surface.

In a next step 612, a select amount of the light cone is deflected by the spatial light modulator towards a photodiode array (e.g., Geiger mode APD array 114 of FIG. 1). The amount of the cone of light is selected to cause full or only partial illumination of the photodiode array. In the case of partial illumination, the deflecting causes a spatial mapping of scene content to at least one first photodiode of the photodiode array and a blocking of light from passing to at least one second photodiode of the photodiode array. As a result, the sensitivity across the photodiode array is selectively and/or dynamically made uniform. The photodiode array detects the incident photons, outputting whether a detection has or has not occurred for the current laser pulse, as shown by step 614.

Thereafter, step 618 is performed where the photon detections are processed to generate data relating to the environment of interest. The data may then be presented to a user of a computing device, as shown by step 620. Subsequently, step 622 is performed where method 600 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for acquiring data relating to an environment of interest, comprising:
   receiving by a lens of a telescope light scattered by an object within the environment;
   focusing a cone of light towards a spatial light modulator which is placed a certain distance from the telescope on a telescope-focus surface;
   deflecting a select amount of the cone of light by the spatial light modulator towards a photodiode array, whereby a sensitivity across the photodiode array is made uniform;
   detecting which photodiode of the photodiode array constitutes a dead or hot detector;
   assigning at least one micromirror of the spatial light modulator to the photodiode determined to constitute the dead or hot detector; and
   dynamically transitioning a state of the at least one micromirror from an ON state in which the at least one micromirror is tilted towards illumination provided by the telescope to an Off state in which the at least one micromirror is tilted away from the illumination provided by the telescope.

2. The method according to claim 1, wherein the spatial light modulator comprises a digital micromirror device.

3. The method according to claim 1, wherein the spatial light modulator comprises an array of micromirrors arranged in a geometric form which corresponds to scene content to be modulated prior to reaching the photodiode array.

4. The method according to claim 1, wherein each of a plurality of micromirrors comprising the spatial light modular is statically placed in one of at least two tilted positions.

5. The method according to claim 1, wherein the amount of the cone of light is selected to cause only partial illumination of the photodiode array.

6. The method according to claim 1, wherein said deflecting causes a spatial mapping of scene content to at least one first photodiode of the photodiode array and a blocking of light from passing to at least one second photodiode of the photodiode array.

7. A method for acquiring data relating to an environment of interest, comprising:
   receiving by a lens of a telescope light scattered by an object within the environment;
   focusing a cone of light towards a spatial light modulator which is placed a certain distance from the telescope on a telescope-focus surface;
   deflecting a select amount of the cone of light by the spatial light modulator towards a photodiode array, whereby a sensitivity across the photodiode array is made uniform;
   assigning at least one first micromirror of the spatial light modulator to a dead or hot photodiode; and
   tilting the first micromirror in a direction away from illumination by the telescope.

8. The method according to claim 7, wherein the photodiode array comprises a Geiger mode avalanche photodiode array.

9. A system, comprising:
   a photodiode array;
   a telescope receiving light scattered by an object within an environment and for focusing a cone of light towards a spatial light modulator;
   the spatial light modulator placed a certain distance from the telescope on a telescope-focus surface, and deflecting a select amount of the cone of light towards the photodiode array, whereby a sensitivity across the photodiode array is made uniform; and
   a microprocessor configured to assign at least one micromirror of the spatial light modulator to a photodiode constituting a dead or hot detector, and dynamically transition a state of the at least one micromirror from an ON state in which the at least one micromirror is tilted towards illumination provided by the telescope to an Off state in which the at least one micromirror is tilted away from the illumination provided by the telescope.

10. The system according to claim 9, wherein the spatial light modulator comprises a digital micromirror device.

11. The system according to claim 9, wherein the spatial light modulator comprises an array of micromirrors arranged in a geometric form which corresponds to scene content to be modulated prior to reaching the photodiode array.

12. The system according to claim 9, wherein each of a plurality of micromirrors comprising the spatial light modular is statically placed in one of at least two tilted positions.

13. The system according to claim 9, wherein the amount of the cone of light is selected to cause only partial illumination of the photodiode array.

14. The system according to claim 9, wherein said deflecting causes a spatial mapping of scene content to at least one first photodiode of the photodiode array and a blocking of light from passing to at least one second photodiode of the photodiode array.

15. A system, comprising:
   a photodiode array;
   a telescope receiving light scattered by an object within an environment and for focusing a cone of light towards a spatial light modulator; and
   the spatial light modulator placed a certain distance from the telescope on a telescope-focus surface, and deflecting a select amount of the cone of light towards the photodiode array, whereby a sensitivity across the photodiode array is made uniform;
   wherein:
      at least one first micromirror of the spatial light modulator is assigned to a dead or hot photodiode; and
      the first micromirror is tilted in a direction away from illumination by the telescope.

16. The system according to claim 15, wherein the photodiode array comprises a Geiger mode avalanche photodiode array.

* * * * *